United States Patent [19]

Kuznetsov et al.

[11] 3,987,967
[45] Oct. 26, 1976

[54] METHOD OF WORKING MATERIALS AND DEVICE FOR EFFECTING SAME

[76] Inventors: Jury Nikolaevich Kuznetsov, prospekt Lenina, 55, kv. 45; Vladimir Alexandrovich Abrosimov, ulitsa Krasnoborskaya, 1a, kv. 43, both of Yaroslavl, U.S.S.R.

[22] Filed: Dec. 15, 1975

[21] Appl. No.: 641,085

[30] Foreign Application Priority Data

Dec. 19, 1974 U.S.S.R............................ 2081453
Dec. 19, 1974 U.S.S.R............................ 2081454
Dec. 19, 1974 U.S.S.R............................ 2081455

[52] U.S. Cl.................................. 241/1; 241/170; 259/DIG. 46
[51] Int. Cl.²........................................ B02C 17/24
[58] Field of Search ............... 241/1, 170, 171, 122; 259/1, DIG. 46

[56] References Cited
UNITED STATES PATENTS

| | | | |
|---|---|---|---|
| 3,219,318 | 11/1965 | Hershler............................. | 259/1 R |
| 3,691,130 | 9/1972 | Logvinenko.......................... | 241/1 |
| 3,774,885 | 11/1973 | Logvinenko et al. ......... | 259/DIG. 46 |
| 3,787,034 | 1/1974 | Shvartsman et al. ......... | 259/DIG. 46 |
| 3,829,028 | 8/1974 | Oucharenko et al. .................. | 241/1 |
| 3,869,251 | 3/1975 | Tsantker et al.............. | 259/DIG. 46 |

*Primary Examiner*—Granville Y. Custer, Jr.
*Attorney, Agent, or Firm*—Haseltine, Lake & Waters

[57] ABSTRACT

The proposed method of working materials comprises the action upon a material placed in a chamber by a plurality of magnetic elements of a magnetically hard material placed in the same chamber and moving chaotically under the action of an alternating magnetic field produced by an electric winding in the space where the chamber is found. The method of the present invention is characterized in that the magnetic elements are placed in the chamber to form a layer whose height is selected within the limits:

$$2a < h_c < 2 \cdot 10^{-2} \frac{B_r \cdot {_I}H_c}{\rho \cdot g},$$

where
$a$ is the average size of the magnetic elements, cm;
$h_c$ is the height of the layer of the magnetic elements, cm;
$B_r$ is the remanent induction of the magnetically hard material, gausses;
${_I}H_c$ is the coercive magnetic force of the magnetically hard material, oersteds;
$\rho$ is the density of the magnetically hard material, g/cm³;
$g$ is the acceleration of gravity, cm/sec².

The amplitude of the magnetic field intensity is selected within the following limits:

$$10^2 \; \rho \; \frac{a^2 f^2}{B_r} < H_o < 0.8 {_I}H_c,$$

where
$f$ is the frequency of the magnetic field, Hz;
$H_o$ is the amplitude of the magnetic field intensity, oersteds.

The proposed device for effecting the foregoing method is characterized in that it comprises at least one chamber whose height amounts to 1.1 to 1.5 of the height of the layer of magnetic elements, the number of said chambers being selected so that their total volume is equal to 0.8 to 1.0 of the working volume of the magnetic field.

15 Claims, 7 Drawing Figures

METHOD OF WORKING MATERIALS AND DEVICE FOR EFFECTING SAME

The present invention relates to methods of working materials, such as powders, liquids and gases and their mixtures, as well as to a device for effecting this method.

There exists a great number of technological processes connected with working said materials. These processes include fine and superfine grinding, dispersion, mixing, emulsification, absorption, extraction, etc.

The basic requirements imposed upon these processes in industry are aimed at raising the quality of materials, as well as minimizing the working time and production costs per output unit.

The quality of a finished material is characterized by the areas of the newly formed phase surfaces. In the case of grinding and dispersion, these are the areas of the material's specific surface; in the case of mixing, emulsification and absorption, these are the areas of phase contact surfaces. In order to ensure a required quality of the material over a minimum possible period of time, it is necessary to apply a maximum possible power (energy per unit of time) to a unit of the material being worked. The known methods of working materials are characterized by different amounts of power available which are often inadequate to meet the first two of the aforementioned conditions.

The working costs are largely determined by power consumption.

However, the known methods are marked by relatively high losses of energy per unit of output. These losses largely occur in energy transmission units as energy is being transmitted from a power source to the material being worked. For example, in the case of electric energy and electromotors, energy losses occur in the motor, the reduction gear, bearings, etc. In using low-pressure steam, energy is lost in steam superheating means and supply piping.

Advantages and drawbacks of known methods will be better illustrated by the operation of devices that effect these methods.

In grinding and dispersion processes, a material is destroyed by the grinding action of grinding bodies which are either particles of the same material or particles of the surrounding medium (liquid or gas). The names of grinders or mills employed for different purposes are indicative of the respective working methods.

Most extensively used in industry are ball, vibrating and air-stream mills and disintegrators.

Ball mills are the most economical in grinding abrasives, for in this case the power consumption rate only amounts to 0.02 kw per cubic decimeter of material. These mills are marked by a limited grinding fineness and prolonged grinding cycle. The specific duty of ball mills is directly proportional to the square root of the grinding chamber's diameter; hence, high-efficiency ball mills have a large diameter (4 to 5 meters) and length (24 to 30 meters).

In the case of disintegrators, the power consumption rate reaches 0.3 kw per cubic decimeter of material. These are only fit for grinding comparatively soft materials. A serious drawback of a disintegrator is the wear of beaters.

Vibrating mills are fit for working different materials and have a greater power consumption rate, as compared to ball mills (up to 1 to 1.5 kw per cubic decimeter of material), due to accelerations that are in excess of the acceleration of gravity. The fineness of grinding in this case reaches 1 to 2 m$\mu$; the processing efficiency is directly proportional to the frequency and square root of the amplitude of vibration. The major drawbacks of vibrating mills are a short service life and limited volume (up to 1 m$^3$).

Air-stream mills have a small size and great power consumption rate (up to 2 kw per cubic decimeter of material), yet the auxiliary equipment, such as boiler rooms, compressor houses, steam superheaters, and dedusting means accounts for high processing costs. Although wear in such mills is minimized, power consumption is high, as well as losses of material carried away by exhaust gases. Besides, the impossibility of developing high speeds for grinding small-size particles limits the minimum sides of particles to $10^{-10}$ m$\mu$.

Other types of mills have not found extensive application in industry. For example, an electrohydraulic crusher is only fit for crushing big lumps of a material; as regards cavitation and ultrasonic mills, these are only fit for crushing soft rock or grinding small particle aggregates, due to a comparatively low power of generated oscillation and short elastic wave lengths.

The most effective methods of mixing, emulsification, extraction and absorption are methods, whereby use is made of different ways of mechanically mixing contacting phases, in order to produce a great contact area between phases, which determines the processing times, as well as to reduce the size of apparatus for carrying out the aforesaid processes. An example of mixing materials can well illustrate the disadvantages of these methods. There are two basic methods of mixing materials in liquid media, irrespective of the types of media being mixed, which may be a liquid and a gas, a liquid and a liquid, or a liquid and a powder. These methods include the mechanical method (carried out with the aid of different types of mixers or stirrers), and the pneumatic method (whereby the mixing is done by compressed air or an inert gas). Mixing may also be carried out in pipes or with the aid of nozzles. In the case of mechanical mixers, the power consumption rate amounts to 0.3 kw per cubic decimeter of material; in the case of pneumatic mixers it is somewhat lower.

In mixing, the major problems are to increase the surface area of contacting phases, and reduce concentration, temperature and other gradients in the apparatus.

However, the known methods prove to be inadequate in solving these problems, due to long duration of working processes, high power consumption, and the formation of low-intensity and stagnant zones. The known mixing apparatus are cumbersome; apparatus intended for mixing mterials under pressure or in vacuum are too sophisticated.

Recent years have seen some improvements in mixing and dispersion processes. Methods have been evolved which make use of the movement of a plurality of ferromagnetic elements in a material being worked, said movement being produced by a variable magnetic field. This reduces the number of power transmission links. One of such methods is based upon the use of magnetically soft elements and a rotary magnetic field. Although making it possible to carry out mixing and dispersion processes under pressure or in vacuum, apparatus for effecting the above method are marked by a low electrical efficiency, complicated winding cooling system, limited cubic content of the working chamber, and inadequate power consumption rate.

Other methods of working materials use magnetically hard ferromagnetic elements and variable magnetic fields, in particular, pulsed magnetic fields.

According to these methods, a material is placed in a chamber having any desired shape, which chamber also contains magnetized elements of a magnetically hard material. The chamber is then placed in a variable magnetic field which causes the magnetic elements to chaotically move (to rotate around their axes and collide with one another) and thus work the material (cf. U.S. Pat. Nos. 3,219,318, of Nov. 23, 1965, and 3,423,880, of Sept. 29, 1969).

According to the methods as set forth in the above-mentioned patent specifications, the magnetic elements are of a magnetically hard material having a coercive force of more than 50 oersteds. The elements have a non-spherical (indeterminate) shape, their average size being no less than one domain (a few tenths of a micron) and no more than one inch. The intensity of the magnetic field is more than 0.01 oersted, and its frequency may be as high as one megacycle. The methods under review are intended for periodically interrupted or continuous working of materials in small vessels (such as boxes, ducts, tubes and capillaries), as well as for grinding (or drilling) hard-to-get-at surfaces.

Each device for effecting the foregoing methods comprises a solenoid-type winding and a working chamber of a non-magnetic material, which chamber is placed inside or outside the solenoid, in the zone where there is produced a variable sinusoidal magnetic field. Being placed in said chamber, magnetic elements of barium ferrite or alnico 8 alloy, having an indeterminate shape, are acted upon by the field, whereby they mix or grind the material. The number of elements in the chamber is selected so that while moving in the chamber, said elements are at sufficiently great distances from one another to avoid mutual wear. This amount is less than the amount of elements required to cover, in a monolayer, the entire bottom surface of the chamber.

The methods being discussed are advantageous in that they minimize the number of energy transmission links which only include the electric winding, the magnetic elements and the material being worked. Their strong points also include the simplicity of the electric winding and its cooling means, the small size of the apparatus, and low noise level.

Yet the foregoing methods and apparatus for effecting these methods also have some essential drawbacks.

The main drawback is a low power consumption rate due to a small quantity of magnetic elements per unit of the working chamber's volume. This results in great power consumption per unit of finished product (due to the fact that the entire volume of the magnetic field is not gainfully utilized), which, in turn, leads to increased production costs. The latter factor hampers the industrial use of such apparatus. Experiments have shown that an increased number of magnetic elements in the working chamber leads, on the one hand, to rapid wear of said elements, whereby the material being worked is contaminated and the production costs grow as a result of the great consumption of the expensive magnetic material; on the other hand, an increased number of magnetic elements in the chamber accounts for the fact that the movement of the lower magnetic elements is less intensive than that of the upper magnetic elements, due to the force of gravity of the upper magnetic elements. Upon reaching a certain limiting layer height, the elements cease moving, irrespective of the method's parameters. The result is the impossibility of producing apparatus having high efficiency and power consumption rate.

The authors of the present invention have established and proved that within the parameters specified in the above-mentioned U.S. patent specifications, there is no movement of the magnetic elements at all in most cases, i.e. the methods according to said U.S. patent specifications do not always work.

Apparatus for effecting these latter methods have important disadvantages. One of these is incomplete coverage by the magnetic elements of the entire space of the magnetic field produced by the sinusoidal winding. Another disadvantage is non-uniformity of the magnetic field. The above disadvantages result, in turn, in a low power consumption rate (not more than 0.01 kw per cubic decimeter of product). In addition, due to the action of the field gradient, the magnetic elements are moved to that zone in the chamber where the field intensity is at its highest, which causes unnecessary mutual wear of the magnetic elements. Still further, as a result of a proportional increase in the working dimensions of the apparatus, the latter's specific duty is reduced according to the exponential law, due to a limited height of the moving magnetic elements.

It is an object of the present invention to provide a method for working materials whereby a material placed in a chamber is acted upon by a plurality of magnetic elements of a magnetically hard material, said elements being arranged in the chamber in such a layer that at a certain amplitude of a magnetic field, they ensure a high power consumption rate (up to 2 to 3 kw/dm$^3$) and relatively low power consumption per unit of the finished product, as well as to provide an apparatus for effecting the above method, which would be simple in design, and highly efficient, and which would have high electromechanical efficiency.

It is another object of the invention to provide a method for intensively and continuously grinding powder materials, which method would ensure the possibility of adjusting the fineness of grinding within a broad range and minimize the wear of magnetic elements.

It is still another object of the present invention to provide a method for working bulk materials with a limited degree of looseness.

It is yet another object of the present invention to provide an apparatus having a relatively uniform magnetic field in its working chamber and a winding of a small weight, which apparatus can be powered by polyphase electric current.

The above and other objects of the invention are attained by providing a method of working materials, whereby a material placed in a chamber is acted upon by a plurality of magnetic elements of a magnetically hard material placed in the same chamber and moving chaotically under the action of a variable magnetic field produced by an electric winding in the space where said chamber is located, the magnetic elements being arranged in the chamber, according to the invention, in a layer whose height is selected within the following limits:

$$2a < h_c < 2 \cdot 10^{-2} \frac{B_r \cdot {}_iH_c}{\rho \cdot g},$$

where
- $a$ is the average size of the magnetic elements, cm;
- $h_c$ is the height of the layer of the magnetic elements, cm;
- $B_r$ is the remanent induction of the magnetically hard material, gausses;
- $_iH_c$ is the coercive force of the magnetically hard material, oersteds;
- $\rho$ is the density of the magnetically hard material, g/cm³;
- $g$ is the acceleration of gravity, cm/sec²;

the amplitude of the magnetic field intensity being selected within the following limits:

$$10^2 \frac{\rho \cdot a^2 f^2}{B_r} < H_o < 0.8 \,_iH_c ,$$

where
- $f$ is the frequency of the magnetic field, Hz; and
- $H_o$ is the amplitude of the magnetic field intensity, oersteds.

The objects of the present invention are further attained by providing an apparatus for effecting the foregoing method for working materials, comprising a working chamber filled with a plurality of magnetic elements of a magnetically hard material, and an electric winding enveloping the working chamber and producing a variable magnetic field therein, which apparatus further includes, in accordance with the invention, at least one chamber whose height amounts to 1.1 to 1.5 of the height of the layer of magnetic elements, the number of said chambers being selected so that their total volume is equal to 0.8 to 1.0 of the working volume of the magnetic field.

In order to adjust the fineness of working, the amplitude of the magnetic field's intensity can be changed, as the material leaves the chamber, in inverse proportion to the required degree of fineness.

In order to improve grinding and dispersion of materials and reduce wear of magnetic elements, it is advisable that use should be made of spheroidal magnetic elements.

In order to intensify the working and make it possible to use materials having high magnetic permeability, it is preferable to employ equiaxial magnetic elements.

In order to accelerate the working process and reduce wear of magnetic elements, it is expedient that the material being worked should be placed in the working chamber in an amount of 20 to 80 percent of the bulk volume of the magnetic elements.

For continuous working of powder-like materials and adjusting the fineness, it is expedient that the chamber should be slanted to the horizontal, the angle of slope being adjustable within the limits of 3° to 20°.

In order to activate powder-like materials, improve their fluidity and adjust the flow rate through the chamber, a gaseous agent may be introduced under the material being worked.

For intensified and economical grinding and dispersion of materials, it is advisable to use magnetic elements whose sizes are 10 to 200 times greater than those of particles of the material being worked.

In order to raise the efficiency of the apparatus, it is expedient that the chambers should be connected either in series or in parallel.

In order to raise the efficiency of the apparatus, improve the uniformity of the magnetic field and reduce power consumption, it is expedient that use should be made of a solenoidal winding, the ratio between the length and the mean diameter of said winding being less than three.

In order to improve the effectiveness of the apparatus, reduce the weight of the winding and facilitate the maintenance of the apparatus, it is expedient that the winding should be constructed in the form of two flat rings placed on the top and bottom of an annular working chamber and having opposite current directions.

In order to make it possible to use polyphase power current, it is expedient that the winding should be sectional, the number of separate sections being divisible by that of the current phases.

In order to adjust the degree of fineness in continuous operation, the apparatus may have an additional winding arranged at the chamber's outlet, said additional winding being connected to a voltage regulator.

The invention essentially resides in the following.

According to experimental data and the theory of the behaviour of a group of magnetized elements of magnetically hard materials in a variable magnetic field, the maximum torque (the maximum power) of the magnetic elements is determined by the magnetically hard material, or, more exactly, by the parameters of the rotational hysteresis curve of that material.

The limiting magnitudes of this power occur at an amplitude $H_o$ of the intensity of the variable magnetic field, which amounts to 0.5 to 1.0 of the magnetic coercive force $_iH_c$ of the material, i.e. when $H_o = (0.5$ to $1.0)_iH_o$ oersteds. To simplify the calculation, keeping in mind different forms of the rotational hysteresis, the maximum value of the variable magnetic field's intensity is assumed to be $H_{o_{max}} = 0.8 \,_iH_c$.

The maximum power developed per unit of volume (weight) of the magnetically hard material causes a limiting dynamic pressure developed by the chaotically moving magnetic elements and, consequently, the limiting height $h_c$ of the layer of magnetic elements moving at a maximum $h_o$ for the given magnetically hard material. Below this layer, the particles cannot move because of the pressure of the particles above. Theoretically, the limiting maximum height is expressed as follows:

$$h_c \approx 2 \cdot 10^{-2} \frac{B_r \cdot _iH_c}{(\rho_m - \rho_c)g},$$

where
- $B_r$ is the remanent induction of the magnetically hard material, gausses;
- $\rho_m$ is the density of the magnetically hard material, g/cm³;
- $\rho_c$ is the density of the fluid being processed, g/cm³; g is the acceleration of gravity, cm/sec².

As a rule, $\rho_c$ is not more than 1, and $\rho_m$ is between 4 and 8. Besides, in processing powders and aerating liquids, $\rho_c$ is much less than unity, so it is assumed for the calculation that $$h_{c_{max}} \approx 2 \cdot 10^{-2} \cdot \frac{B_r \cdot _iH_c}{\rho_m \cdot g}.$$

It has also been established that there is a minimum value of the amplitude of the variable magnetic field's intensity required to set in chaotic motion a group of magnetic elements at least in the uppermost layer of these elements. The amplitude depends upon the material of the particles and their size, as well as upon the frequency of the field, and is expressed as follows:

$$H_{o_{max}} \approx 10^2 \frac{\rho_m a^2 f^2}{B_r} \text{ oersteds,}$$

where
 $f$ is the frequency of the magnetic field, Hz; and
 $a$ is the average size of the magnetic elements, cm.

These basic rules have been employed to provide highly economical methods for working materials by magnetic elements moving chaotically in a variable magnetic field produced by an electric winding, as well as high-capacity apparatus for carrying out different technological processes.

According to the invention, there is used a certain amount of magnetic elements which are uniformly spread over the entire surface of the chamber's bottom and form a layer whose height in the static state is within the following limits:

$$2a < h_c < 2 \cdot 10^{-2} \frac{B_r \cdot {}_iH_c}{\rho_m \cdot g} \text{cm.}$$

The lower limit of the layer height is double the size of the magnetic elements in order to ensure their full interaction in the course of the production process.

A specific value of $h_c$ is then found, and a chamber is selected whose height $h_k$ is not more than 1.1 to 1.5 of the height of the layer of the magnetic elements. The purpose is to maximally employ the volume of the moving elements.

The working chamber is supposed to occupy almost the entire volume of the magnetic field produced by the winding of the apparatus. The boundaries of this volume are a combination of geometrical points in the space not occupied by the winding, where the amplitude of the field intensity is not less than half of the maximum amplitude of the intensity of the field produced by the winding. For example, in the case of a relatively long solenoid, this space is defined by the butt ends and the inner space of the solenoid.

Upon charging a material or a mixture of materials to be worked into the chamber, in the working space of the winding there is produced a variable magnetic field by applying voltage to said winding. $H_o$ in the winding must be sufficient to set the magnetic elements in motion, but not in excess of a maximum permissible value for a given material, which means it must be within the following limits:

$$10^2 \cdot \frac{\rho \cdot a^2 f^2}{B_r} < H_o < 0.8 \, {}_iH_c \text{ oersteds.}$$

The lower limit of $H_o$ is determined with greater accuracy, depending upon the minimum driving forces of particles required to carry out a given technological process. It has to be borne in mind in this connection that an increase in the field intensity results in quadratic power losses for heating the winding, provided that its thickness remains unchanged. For this reason, a specific value of $H_o$ is selected with due regard to economic considerations, by comparing power losses and the speed at which the material is processed.

All the foregoing operations combined make up a highly economical method of working materials with the aid of working bodies having a more developed specific surface than that of any conventional method, as the minimum size of the magnetic elements is only limited by the properties of the material being worked. The proposed process can only be successfully effected by an apparatus which maintains the required relationship between its size and the parameters of the process. In actual practice, an electromechanical efficiency of such apparatus, which is the ratio between the energy spent to set the magnetic elements in motion to the total amount of power consumed by the apparatus, is 0.85, provided that the cubic content of the chamber is up to 100 liters. With an increase in the chamber's volume, the efficiency of the apparatus also increases.

In the case of using remote or automatic control systems to adjust the grinding fineness, and additional winding is arranged at the chamber's outlet. This winding changes the amplitude of the magnetic field's intensity at the chamber's outlet within the above-mentioned range.

The result is what may be termed as a controlled magnetic gate which ensures smooth and accurate adjustment of the production rate and, consequently, the grinding fineness.

The production rate can also be controlled with the aid of conventional gates or shutters.

In order to reduce wear of the magnetic elements as a result of their friction against the material being worked, as well as friction and collisions between the elements themselves, it is expedient that said elements should be of a rounded, preferably, spheroidal shape. This applies both to magnetically hard ceramic materials and metallic materials. Specific examples of such a shape are the sphere and ellipsoid.

If use is made of a magnetically hard material with a ratio between the remanent induction and the coercive induction force greater than 1.0, one should use equiaxial elements, i.e. elements having an equal rotatory inertia moment with respect to any of the three mutually perpendicular axes of such an element which run through its center of gravity. This requirement is due to the appearance of an antagonistic rotatory moment in the case of non-equixial elements with an increased magnetic permeability.

It has been established that the speed and effectiveness of processing depend upon the amount of the material; the less the amount of the material in the chamber, the greater the processing rate. Yet the minimum amount of the material is limited as it leads to an increased self-wear of magnetic elements due to the absence of any material being processed therebetween. The preferable amount of a material being processed is a ratio of its bulk volume to the bulk volume of the magnetic elements of 20 to 80 percent; the amount of about 50 percent is the optimum, for it makes it possible to completely fill the spacing between the elements.

According to experiments, in continuously processing powdered materials in a horizontally arranged chamber, the flow rate of the material through the chamber and the rate of its processing are dependent upon the angle of the chamber's slant. This method is preferable if the throughput is adjusted manually. The optimum angle of inclination of the chamber to the horizontal plane is between 3° and 20°.

Experimental performance of apparatus for effecting the foregoing methods indicates that there is a limiting length of a slanted chamber for each powdered material, so that said material can pass through the chamber by gravity. The chamber length is limited, on the one hand, by a limiting height of the layer of magnetic elements and, on the other hand, by the fluidity of the material. For cement, for instance, the maximum length of the chamber should not be in excess of 1 m; in the case of aluminum oxide ($Al_2O_3$), it must be 1.5 m. In order to increase the chamber's length, a gaseous agent, for example, air, is introduced under the material being processed. This aerates the material and produces a gas cushion, whereby the mobility of the material is improved. By raising the flow rate of said gaseous agent, it is possible to increase both the length of the chamber and the flow rate of the material through the chamber and thus control the throughput.

It is clear from the description of the last three methods that the material being processed passes through the chamber by gravity. In view of the constant flow rate of the material, there is no need of special feeding and proportioning means.

For griding and dispersion of materials, use is made of magnetic elements whose mean size is selected to be 10 to 200 times greater than the mean particle size of the material being processed. In order to properly select the element size, it should be remembered that an accelerated processing requires a maximum working surface of the elements, which means that the element size must be kept at a minimum. Yet the minimum size of the magnetic elements is limited by the angle at which particles of the material being worked are caught, as well as by the power developed by each magnetic element in order to crush said particles of the material. It has been established theoretically and practically, in a series of tests of the proposed method and apparatus for effecting this method, that for practical purposes, the size of the magnetic elements should be 10 to 200 times that of the particle size of the material being worked.

Other objects and advantages of the present invention will become more apparent from the following detailed description of a preferred embodiment of the apparatus for effecting the proposed method, which is to be read in conjunction with the accompanying drawings, wherein:

Referring now to the attached drawings, the proposed apparatus all comprise working chamber 1 (FIGS. 1 through 7) of a non-magnetic material (stainless steel or rubber) which contains a plurality of magnetic elements 2, preferably, of a spheroidal shape. The magnetic elements 2 are of a magnetically hard material, for example, barium hexaferrite, or manganese-aluminum, samarium-cobalt, ticonal, alnico and other alloys.

The chamber 1 finds itself in a variable magnetic field produced by an electric winding 3 or 3', which is a ring or a solenoid winding, respectively, said winding enveloping said chamber 1. Arranged at the outlet of the chamber 1 is an additional electric winding 4 (FIGS. 1 and 2) connected to a voltage regulator 5. The winding 4 makes it possible to control the effectiveness of the process (the fineness to which the material is worked) through changing the effective cross-sectional area of the chamber 1 at the latter's outlet.

In order to hold the magnetic elements 2 in the working chamber 1, the outlet butt end of the latter is barred by a grid 6. Adjoining the outlet butt end of the chamber 1 is a feed bin 7. The apparatus may be provided with several chambers 1 (FIGS. 3 and 5 through 7), all located in the working zone of the magnetic field.

According to one of the preferred embodiments of the invention, the chambers 1 (FIG. 3) are arranged parallel to one another, with the bin 7 covering all the outlet butt ends of the working chambers 1. The solenoidal winding 3 is constructed from separate, electrically interconnected sections whose number is divisible by that of the power current phases (A, B and C). On the inlet butt ends of the chambers 1 there are slanted partitions 8 to prevent falling out of the magnetic elements 2 from the working chambers 1 and ensure parallel passage of the material through said chambers 1.

According to another embodiment of the apparatus for working materials, the working chamber 1 is disposed between two electric windings 3' (FIG. 4) constructed in the form of two flat rings and connected in opposition to each other.

Figure 4:
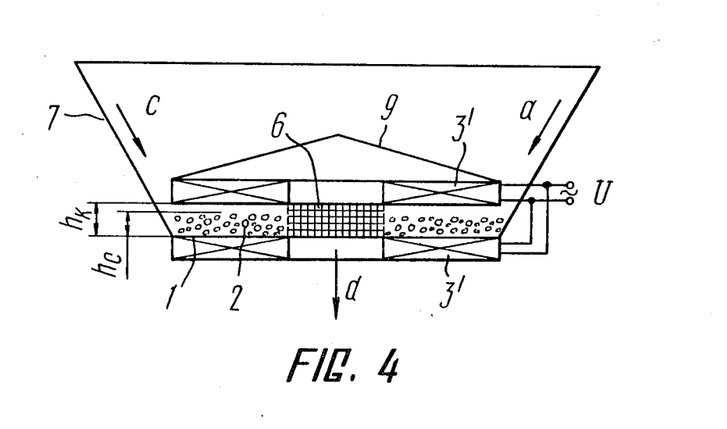
FIG. 4 is a cross-sectional view of an apparatus for working materials, having ring windings and one working chamber.
Figure 5:
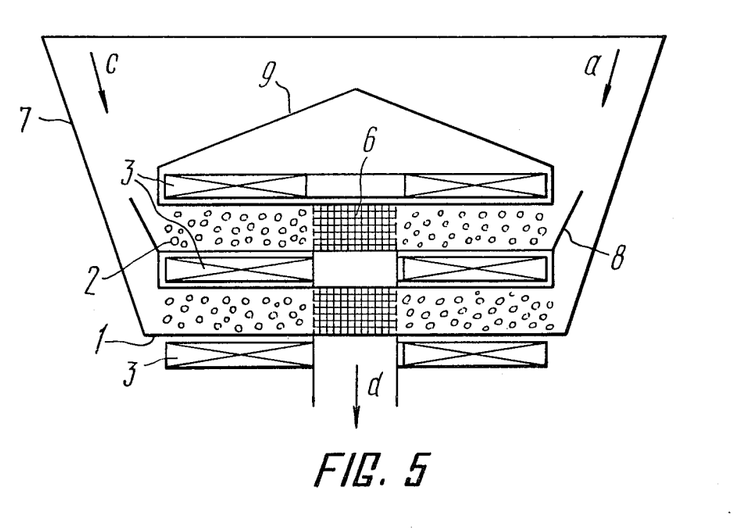
FIG. 5 is a cross-sectional view of the apparatus of FIG. 4, having two working chambers connected in parallel.

The working chamber 1 is a hollow toroid, rectangular-shaped in its radial section. The inner wall of the toroid is the grid 6. On the outside, the chamber 1 is enveloped by the bin 7. The upper ring winding 3 is protected by a cone-shaped bonnet 9.

If the apparatus comprises several (two) working chambers 1 with the ring windings 3' (FIG. 5), said chambers 1 are placed one above the other, the bin 7 enveloping all said chambers 1.

The apparatus with ring windings are advantageouus in a low consumption of winding wire per volume unit of the chamber, as well as in the simplicity of their design and maintenance.

According to still another embodiment of the apparatus, the working chamber is composed of several (six) cylindrical chambers 1 (FIG. 6) arranged one under the other and separated by the grids 6. All the chambers are enveloped by a solid solenoidal winding 3. Adjoining the upper chamber is the feed bin 7.

Figure 7:
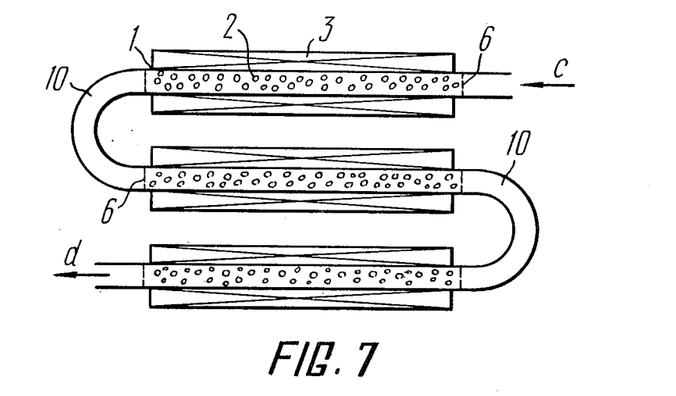
FIG. 7 is an elevated view of an apparatus for working materials, having three chambers connected in series, each chamber being enveloped by a solenoidal winding.

The apparatus of FIG. 7 comprises three independent chambers 1 interconnected by means to ensure successive passage of material in the course of processing from one chamber to another. In this embodiment, said means are pipes 10. On all the butt ends of the chambers 1 there are mounted the grids 6.

Figures 1, 2:
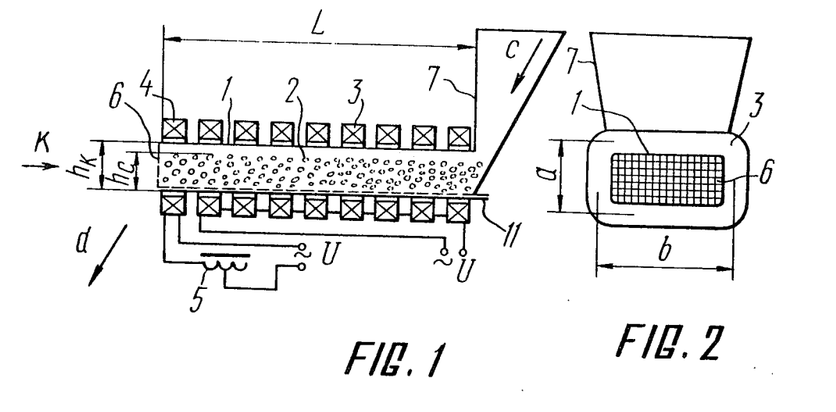
FIG. 1 is a schematic elevated view of an apparatus for working materials with a solenoidal winding and one working chamber.
FIG. 2 is a view taken along the arrow K of FIG. 1.
Figure 3:
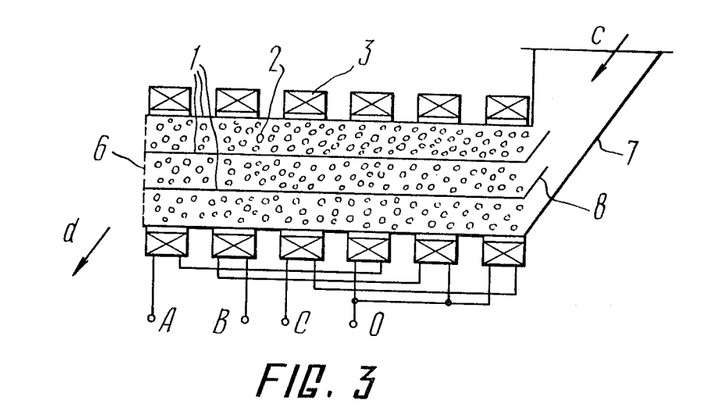
FIG. 3 is a schematic elevated view of an apparatus for working materials having three working chambers connected in parallel.

In the static state, the height of the layer of the magnetic elements in the chamber 1 is designated as $h_c$, the height of the chamber 1 being designated as $h_K$ (FIGS. 1 and 4).

All the aforesaid apparatus are basically intended for continuous working of materials, but they may also be used for periodically repeated or single processes. For all the apparatus under review, the ratio between $h_k$ and $h_c$ is 1.1 to 1.5. The chambers practically occupy the entire effective volume of the magnetic field, i.e. 0.8 to 1.0 of that volume.

Figure 6:
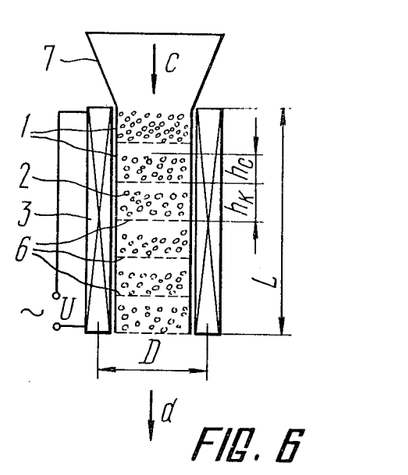
FIG. 6 is a cross-sectional view of an apparatus for working materials, having a solenoidal winding and several working chambers.

The length L of the solenoidal electric winding 3 in the apparatus of FIGS. 1 and 6 amounts to 3 to 15 times its mean diameter D, which makes it possible to improve the uniformity of the magnetic field along the length of the chamber and thus raise the uniformity of processing nd reduce wear of the magnetic elements. If the winding 3 (FIG. 2) is of a rectangular shape or of a shape close to the rectangular, the equivalent mean diameter of said winding 3 is determined from the formula:

$$D_{cp} = \sqrt{\frac{4a \cdot b}{\pi}},$$

where $a$ and $b$ are the mean height and width of the winding, respectively.

Polyphase current makes it possible for the solenoidal winding to produce a travelling magnetic field. If the travelling field is directed in opposition to the force of gravity, the height $h_c$ of the layer of magnetic elements may be increased, which makes it possible to provide highly efficient apparatus, regardless of the fact that such apparatus may only have one working chamber.

The apparatus described above operate as follows.

Prior to the start of operation, the working chamber 1 (FIGS. 1 through 7) is charged with the magnetic elements 2 which form a layer whose height is selected depending upon the properties of the magnetic material and in accordance with the above-mentioned ratio. Alternating voltage is then applied to the electric winding 3 which produces a variable magnetic field in the chamber 1. At a certain amplitude of the field's intensity, which is determined by the properties of the magnetic material, as well as by the frequency of the field and the size of the elements, the magnetic elements in the chamber are set in chaotic motion whose main component is rotating motion. From the feed bin 7, the material to be processed is directed by the force of gravity into the chamber 1, its passage being indicated by the arrow $c$. In the chamber, the magnetic elements 2 subject the material being worked up shear and impact loads. Having passed through the chamber 1 and the grid 6 at its outlet, the material is directed to a collecting box (not shown), the passage of the material being indicated by the arrow $d$. By using the additional winding 4 and the voltage regulator 5, it is possible to alter the amplitude of the magnetic field's intensity in the zone where the material being worked leaves the chamber, and thus adjust the height of the layer of the magnetic elements at the chamber's outlet and so produce an adjustable magnetic gate. The fineness of working is inversely dependent upon the field's amplitude.

Another method of adjusting the fineness of working employs a change in the chamber's slant to the horizontal plane. According to still another method, there is supplied a gas (air) under the material being worked. All these methods are based upon changing the time during which the material is in the chamber.

Given below are specific examples of preferred embodiments of the methods and apparatus in accordance with the invention.

EXAMPLE 1

Consider an example of fine grinding of the γ modification of aluminum oxide.

Micrometric measurements indicate that the fineness of dispersion of the initial powder is 100 m$\mu$. The end material serves as an abrasive to be used in grinding and polishing pastes. The magnetic elements are isotropic spherical elements of barium hexaferrite, having a diameter of 5 mm.

The estimated height of the layer of the magnetic elements is:

$$h_{c_{max}} = 2 \cdot 10^{-2} \frac{B_r \cdot {}_IH_c}{\rho_m \cdot g} = \frac{0.02 \cdot 2100 \cdot 3000}{5.981} = 25 \text{ cm},$$

where $B_r = 2,100$ Hz, ${}_IH_c = 3,000$ oersteds, $\rho = 5$ g/cm³, and $g = 981$ cm/sec.

Placed in the chamber 1 (FIGS. 1 and 2) are the electromagnetic elements 2 which form a layer whose height $h_c = 12$ cm, in order to uniformly work the material throughout the height of the layer. This is due to the fact that the magnetic elements at the bottom work less intensively, especially if part of the elements have inferior magnetic properties.

The maximum possible amplitude of the magnetic field's intensity is:

$$H_{o_{max}} = 0.8 {}_IH_c = 2,400 \text{ oersteds}.$$

The minimum possible amplitude $H_o$ is:

$$H_{o_{min}} = 10^2 \frac{\rho \cdot a^2 f^2}{B_r} = \frac{100 \cdot 5 \cdot 0.5^2 \cdot 50^2}{2100} = 130 \text{ oersteds},$$

where $a = 0.5$ cm, and $f = 50$ Hz (power current frequency).

The amplitude of the magnetic field's intensity in this case is 800 oersteds, in order to minimize the power losses in the electric winding and the copper consumption to construct the winding (the latter is 6 kg per liter of the chamber's volume). The height $h_k$ of the chamber is selected from the ratio $h_k/h_c = 1.25$, so it is equal to 15 cm. Other dimensions of the apparatus are selected with due regard for the throughput, the uniformity of the magnetic field, the possibility for the material being worked to move by gravity, and the processing costs.

The basic parameters of the apparatus are as follows: the volume of the chamber, 100 liters; the chamber length, 120 cm; the chamber width, 60 cm. The electric winding tightly envelops the chamber and consists of 16 coils. The winding is connected to an autotransformer. The copper thickness in the winding is 4 cm. The weight of the magnetic elements is 130 kg, their bulk volume being 80 l. The volume of aluminum oxide in the chamber is 50 l.

From the feed bin 7, aluminum oxide is directed by gravity into the chamber 1. The apparatus is inclined at an angle of 6° to 7° to the horizontal plane, which provides for free passage of the material being worked through the entire length of the chamber. The mean grinding time (the time during which the material is inside the apparatus) is 3 to 4 minutes. Micrometric measurements show that the dispersion of the ground aluminum oxide is about 20 m$\mu$. Testing samples are taken each 10 minutes. The apparatus' throughput and the dispersion degree prove to be constant. The power consumption is 15 kwhr per ton of end product. For greater convenience in operation, the throughput is also controlled with the aid of the additional winding. The magnetic element wear is about 0.2 kg per ton of end product. In continuous operation, the throughput is about 1,000 kg per hour.

Comparative tests show that as regards the specific duty and power consumption, the proposed method is scores of times more effective than conventional grinding methods, for example grinding with the aid of ball mills. The proposed method is hundreds of times more economical than the grinding with the aid of air-flow mills.

EXAMPLE 2

An apparatus having parameters as those of Example 1 is used for final grinding of a mixture of cement and ash. The magnetic elements are of a manganese-aluminum alloy and have a spheroidal shape and a size of about 4 mm. Air is supplied into the chamber in order to improve the transportation of the material through the chamber. For this purpose, provision is made for a branch pipe 11. The starting materials are cement having a compressive strength of 400 kg/cm, and ash with a content of combustible substances of 18 percent. The initial specific surface of the mixture is 3,200 cm$^2$/g.

Cement is taken in an amount of 75 percent by weight, and ash in an amount of 25 percent by weight. The results are as follows:
  the end specific surface, 5,150 cm$^2$/g (measured by using the Kozin-Karman method);
  throughput, 1 ton per hour;
  power consumption, 20 kwhr per ton of end product;
  magnetic element wear, 0.5 kg per ton of material.
In 28 days after the processing, the compressive strength of the finely ground binder is 504 kg/cm$^2$. This means a 25% saving of cement and improved quality of the binder.

With both cement and ash taken in an amount of 50 percent by weight, the following results are obtained:
  the end specific surface, 4,850 cm$^2$/g;
  magnetic element wear, 0.7 kg per ton of material.
In 28 days after the processing, the compressive strength of the finely ground binder is 380 kg/cm$^2$, which means a 50% saving of cement and practically unchanged quality of the binder.

The remaining parameters are the same.

To obtain the same results by using vibrating or air-flow mills would require a 2- to 5-fold increase in the processing costs.

EXAMPLE 3

Consider now an example of final grinding of portland cement.

The starting portland cement has a specific surface of 3,000 cm$^2$/g (measured by using the air permeability method). The compressive strength of the portland cement (on the 28th day) is 430 kg/cm$^2$. The grinding apparatus has a working chamber 1 with a cubic content of 10 dm$^2$ (FIG. 4). Magnetic elements of barium hexaferrite, having a spherical shape and a diameter of 5 mm are placed in the chamber to form a layer of 8 cm in height. The copper consumption is 5 kg per cubic decimeter of the chamber's volume. After the grinding, the specific surface of the portland cement is 5,200 cm$^2$/g, whereas its compression strength is 650 kg/cm$^2$. Magnetic element wear is 1.0 kg per ton of material; the power consumption reaches 20 kwhr per ton of material; the throughput is up to 100 kg per hour.

With the use of conventional vibrating mills the same results are achieved at a cost which is twice as high as the processing cost in the case of the proposed apparatus.

EXAMPLE 4

Consider the process of dispersion of pigments in binders. There is dispersed a suspension comprising carbon black and alkid varnish, the weight ratio therebetween being 7:3, respectively. The magnetic elements are of a manganese-aluminum-carbon alloy, of a spherical shape and have a size of 2 to 4 mm. The height of the layers of the magnetic elements in the chambers 1 (FIG. 6) is 5 cm; the height of the chamber is 7 cm; there are six chambers 1 with a total cubic content of 3 dm$^3$; the number of the electric winding sections is 3 to 6. Prior to the processing, the dispersion fineness of the suspension is more than 200 m$\mu$ (measured with the aid of a Hegmann instrument); after the processing, the dispersion is 15 m$\mu$. The intensity of the magnetic field is 500 oersteds; the power consumption is 30 kwhr per ton of suspension; the wear of magnetic elements is 1.0 kg per ton of suspension; the throughput is 30 kg per hour. The process is 50 to 100 percent more economical than in the case of bead mills.

EXAMPLE 5

Next consider emulsification of a mixture of silicone resin and 1% solution of polyvinyl alcohol with a ratio therebetween of 1:1. The emulsion thus obtained is a component in water emulsion paints.

The process makes use of equiaxial magnetic elements of an alloy comprising aluminum, copper, nickel and cobalt. The magnetic elements are cylinder-shaped and have a length of 5 mm and a diameter of 5 mm. To reduce wear of the magnetic elements, the latter have a plastic coating 0.5 to 1 mm thick. The cubic content of each chamber 1 (FIG. 7) is 5 dm$^3$; the height of the layer of magnetic elements is 8 cm; the height of each chamber 1 is 10 cm. The magnetic field intensity is 300 oersteds. The power consumption is 30 kwhr per ton of emulsion; the throughput is 50 kg per hour. The process is twice as economical as that with the use of rotor emulsifiers. The emulsion thus obtained is highly homogenous and preserves this state for 30 days.

EXAMPLE 6

Consider now one last example, that of mixing carbon dioxide with water.

Use is made of magnetic elements shaped as low cylinders having a diameter of 8 mm and a thickness of 4 mm. The elements are coated with a film of polyurethane resin having a thickness of 1 mm.

The cubic content of the working chamber 1 (FIGS. 1 and 2) is 5 dm$^3$; the intensity of the magnetic field is 1,000 oersteds; the height of the layer of magnetic elements is 8 cm; the power consumption is 2.0 kwhr per m$^3$ of water. It takes 10 seconds to saturate water with gas. The process is 3 to 5 times more economical than with the use of conventional absorbers.

As is seen from the above description, the proposed apparatus are many times more economical (up to 20 times and even more) in carrying out the aforementioned processes than the best known apparatus anywhere in the world. In addition, the proposed apparatus have small dimensions and weight, are simple in design and easy to service.

When in operation, conventional apparatus produce much noise and vibration, which hampers their servicing and accounts for increased capital investments. The noise level in the case of the proposed apparatus is low, whereby the working conditions are improved. Due to a small weight per unity of weight of a material being processed, the proposed apparatus do not require any foundation or bed.

The proposed apparatus may well serve as a prototype for high-throughput industrial installations (having throughputs of more than 100 tons of material per hour).

What is claimed is:

1. A method for processing materials, whereby in the space defined by an electric winding there is placed a chamber containing a plurality of magnetic elements of a magnetically hard material, which elements form a layer whose height is selected within the following limits:

$$2a < h_c < 2 \cdot 10^{-2} \frac{B_r \cdot {}_iH_c}{\rho \cdot g},$$

where $a$ is the mean size of the magnetic elements, cm;
$h_c$ is the height of the layer of magnetic elements, cm;
$B_r$ is the remanent induction of the magnetically hard material, gausses;
${}_iH_c$ is the coercive magnetization force of the magnetically hard material, oersteds;
$\rho$ is the density of the magnetically hard material, g/cm$^3$;
$g$ is the acceleration of gravity, cm/sec$^2$;

whereupon a material to be processed in charged into said chamber, and a variable magnetic field is produced in the space where said chamber is located, the amplitude of said field's intensity being selected within the following limits:

$$10^2 \frac{\rho \cdot a^2 \cdot f^2}{B_r} < H_o < 0.8 {}_iH_c,$$

where $f$ is the frequency of the magnetic field, Hz; and
$H_o$ is the amplitude of the intensity of the magnetic field, oersteds;

after which the material placed in the chamber is acted upon by chaotically moving magnetic elements whose movement is caused by the magnetic field.

2. A method as claimed in claim 1, whereby the amplitude of the intensity of the magnetic field is changed at the chamber's outlet in inverse proportion to a required fineness of the material.

3. A method as claimed in claim 1, whereby use is made of magnetic elements of a spherical shape.

4. A method as claimed in claim 1, whereby use is made of equiaxial magnetic elements.

5. A method as claimed in claim 1, whereby the material to be processed is placed in the chamber in a volume which amounts to 20 to 80 percent of the bulk volume of the magnetic elements.

6. A method as claimed in claim 1, whereby for continuous processing of powdery materials, the chamber is slanted with respect to the horizontal plane, the angle of slant being selected between 3° and 20°, depending upon a required fineness of the end product.

7. A method as claimed in claim 6, wherein a gaseous agent is directed under the material being processed.

8. A method as claimed in claim 1, whereby for grinding and dispersion of materials, use is made of magnetic elements whose mean size is selected to be 10 to 200 times greater than the mean particle size of the material being processed.

9. An apparatus for processing materials, comprising at least one working chamber, a plurality of magnetic elements of a magnetically hard material, forming a layer in said chamber, and an electric winding which envelopes the working chamber and produces a variable magnetic field therein, the chamber height being 1.1 to 1.5 of the height of the layer of magnetic elements, the number of chambers being selected so that their total volume is 0.8 to 1.0 of the effective volume of the magnetic field.

10. An apparatus as claimed in claim 9, which comprises at least two chambers communicated by means which ensure successive passage of the material being processed from one chamber to the other.

11. An apparatus as claimed in claim 9, wherein the chambers communicate with one another through means that ensure parallel passage of the material being processed through all the chambers.

12. An apparatus as claimed in claim 9, wherein the winding is a solenoidal winding with a ratio between its length and mean diameter of about 3 to 15.

13. An apparatus as claimed in claim 9, wherein the working chamber is interposed between two electric windings constructed as flat rings an placed in opposition to each other.

14. An apparatus as claimed in claim 9, wherein the electric winding consists of separate, electrically interconnected sections whose number is divisible by that of the power current phases.

15. An apparatus as claimed in claim 9, wherein at the chamber's outlet there is arranged an additional winding connected to a voltage regulator.

* * * * *